United States Patent [19]

Nedila

[11] 4,041,654
[45] Aug. 16, 1977

[54] COVER FOR BALED HAY AND THE LIKE

[76] Inventor: Walter Nedila, Box 63, MacDowall, Saskatchewan, Canada

[21] Appl. No.: 687,300

[22] Filed: May 13, 1976

[30] Foreign Application Priority Data

Mar. 9, 1976  Canada .................................. 247486

[51] Int. Cl.² .......................... E04B 1/34; B62D 63/04
[52] U.S. Cl. ............................................. 52/3; 52/96; 52/97; 52/543; 52/542
[58] Field of Search ...................... 52/3, 4, 5, 552, 543, 52/542, 530, 750, 96, 97

[56] References Cited
U.S. PATENT DOCUMENTS

| 195,607 | 9/1877 | Hoyt ..................................... 52/542 |
| 269,691 | 12/1882 | Matthews ................................. 52/4 |
| 322,045 | 7/1885 | Dean ........................................ 52/4 |
| 470,527 | 3/1892 | Wiegand .................................... 52/3 |
| 3,857,210 | 12/1974 | Austin ....................................... 52/4 |

FOREIGN PATENT DOCUMENTS 5,552 of  1827  United Kingdom .................. 52/542

Primary Examiner—Alfred C. Perham
Attorney, Agent, or Firm—Cushman, Darby & Cushman

[57] ABSTRACT

A protective cover for a stack of hay bales is provided, the cover comprising a plurality of panels, each of generally shallow inverted V-shape configuration. The panels are disposed side-by-side on the stack with their adjacent edges overlapping. Each panel is provided with a plurality of anchors which project downwardly and engage between certain ones of the bales thereby to assist in preventing the panels from being carried away by the wind.

5 Claims, 11 Drawing Figures

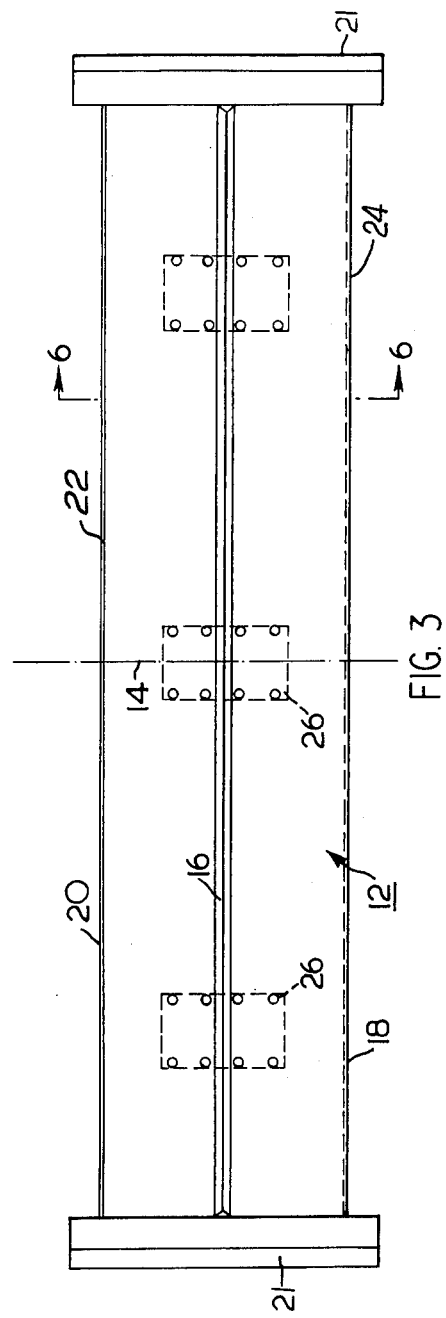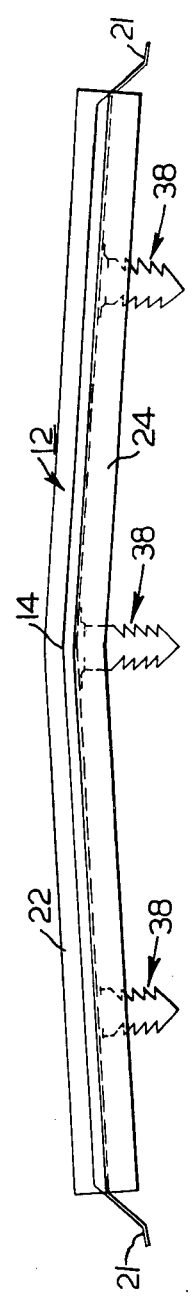
FIG. 3
FIG. 4

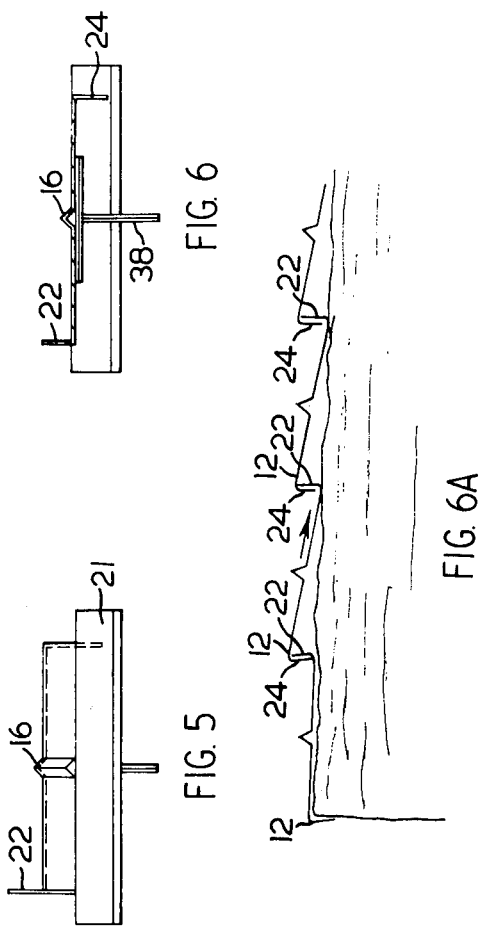

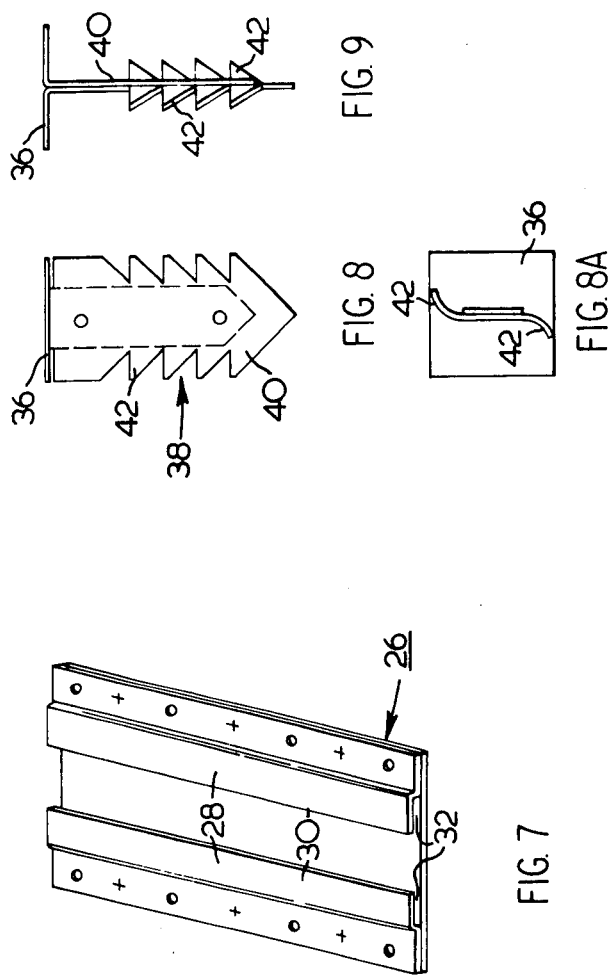

COVER FOR BALED HAY AND THE LIKE

This invention relates generally to portable panel coverings for bales of hay, straw or similar materials.

It is well known to store bales of hay and other similar materials in the open in generally rectangular stacks. To protect the hay from the elements various types of temporary covers such as tarpaulins or plastic sheets have been used. These are subject to deterioration and can easily become torn during handling.

Other types of coverings include metal panels attached to a supporting framework. These tend to be expensive because of their complex construction. In addition, they are difficult to assemble in the field because of their weight and the methods required to assemble them.

More recent forms of covers include a plurality of panels adapted to be arranged on the top of a stack of bales in side-by-side relation with adjacent panel edges in overlapping relation with one another. The panels are secured to the bale stack by retaining pins or the like driven into the sides of the stack with suitable lines extending between the ends of the panels and their associated retaining pins thereby to hold the panels in place against the forces imposed thereon by the wind etc. These arrangements may not always be reliable i.e., the retaining means may loosen and allow the panels to be carried away by the wind.

It is an object of the present invention to provide portable panels for covering stacks of hay bales and the like, said panels being provided with improved means for quickly and securely anchoring same to the top of the stack.

Accordingly, the invention provides, in one aspect, a panel adapted to form a part of a protective cover for a stack of bales of hay or the like, the panel being elongated in form and adapted to be disposed on top of and to span the stack of bales, the panel having means along its opposed longitudinal marginal edges for engagement with additional ones of said panels which, in use, are disposed in side-by-side overlapping relationship with one another thereby to cover the entire top of the stack of bales and prevent rain water from seeping thereinto. Also provided are anchor means which are connected to the lower surface of the panel and which are adapted to project downwardly therefrom into engagement with the bales thereby to secure, or assist in securing, the panel to the stack. Each of the anchors is provided with barbs or the like which are adapted to engage the bales thereby making withdrawal of the anchors relatively difficult.

In a further aspect the anchors are attached to the underside of the panel in such a way as to permit the anchors to be readily detached therefrom, without the use of tools, thereby permitting the panels to be stacked upon one another and transported and stored in a compact fashion.

Each panel may have a shallow V-shaped configuration or a shallow arcuately curved configuration as seen in side elevation. The panels are installed in such fashion as to cause rain water to run to the opposing ends of each panel. The ends of each panel may be provided with a shallow eave, with the eaves of adjacent panels overlapping one another when the panels are in their installed side-by-side positions.

Other features of the invention will be apparent from the following description of a preferred embodiment of the invention, reference being had to drawings wherein:

FIGS. 3 and 4 are plan and front elevation views, respectively, of a panel and anchor means according to the invention;

FIG. 5 is an end elevation of said panel;

FIG. 6 is a section view of the panel taken along line 6—6 of FIG. 3;

FIG. 6A is a diagrammatic section view showing the overlapping relationship of the installed panels;

FIG. 7 is a detail of an anchor guide plate;

FIGS. 8 and 9 are side and end elevation views while FIG. 8A is a view looking toward the lower end, respectively of an anchor for use with the panel.

Figure 2:
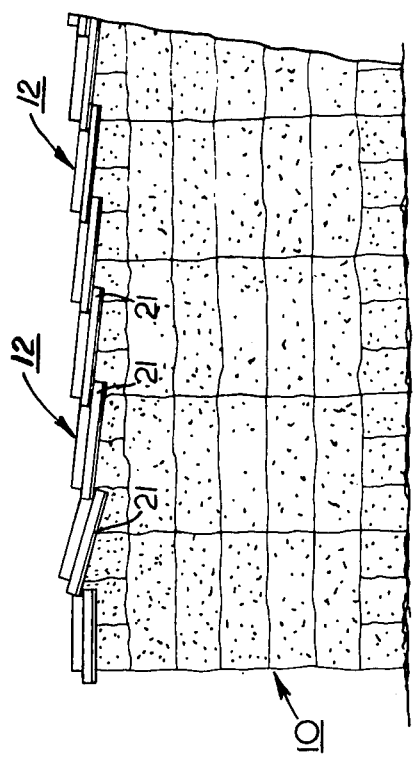
FIG. 2 is a side elevation view of a stack of bales with a cover thereon according to the invention.
Figure 1:
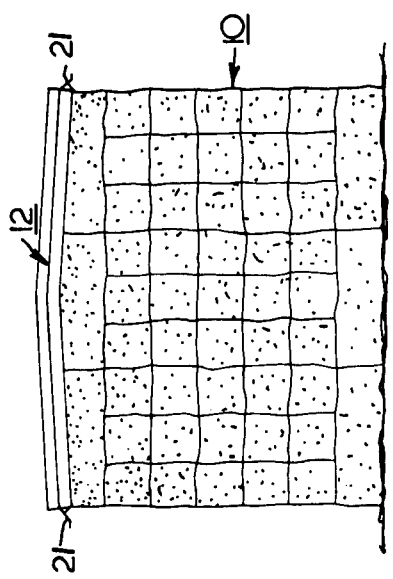
FIG. 1 is an end elevation view of a stack of bales with a cover thereon according to the invention.

With reference to FIGS. 1 and 2 it will be seen that a rectangular stack of hay bales 10 has its upper surface covered with a plurality of elongated panels 12, each of which extends transversely of the stack, with the panels being in parallel side-by-sie relationship with their opposing longitudinal edges being in overlapping relationship.

Each panel 12, as best seen in FIG. 3, has a rectangular outline as seen in plan. Each panel may be made from sheet aluminum, galvanized steel, or from epoxy reinforced glass fibres or the like. As seen in FIG. 4, the panel 12 has a shallow inverted V-shaped configuration with the ridge 14 defined by the apex of the V-shape being located mid-way along the length of the panel. The panel also has a stiffenin rib 16 extending longitudinally thereof between the longitudinal marginal edges 18 and 20 of the panel. The panel is preferably long enough to span at least three standard hay bales placed end-to-end and allow some overhang at each end as well. The opposing ends of the panel are provided with shallow downwardly and outwardly extending eaves 21, which form dip edges for water running along the panel and which also assist in preventing rain water from being driven by the wind underneath the panels. The eaves 21 are preferably slightly wider than the panel so that the eaves of adjacent panels overlap when the panels are installed on a stack of bales as shown in FIG. 2.

Marginal edge 20 of panel 12 has an upwardly turned lip 22 while the other marginal edge 18 has a downwardly turned lip 24. With reference to FIG. 6A it will be seen that the installed panels 12 are disposed in overlapping engagement such that the adjacent oppositely directed lips 22, 24 interengage one another. Furthermore, the upwardly turned lips 22 of each panel prevent water from leaking through between the panels so that all the water is directed to the outer ends of each panel.

As seen in FIGS. 3 and 7, each panel 12 is provided with three anchor guide and support plates 26, these plates 26 being secured to the under surface of the panel by suitable rivets in spaced apart relation, one plate 26 at the center of the panel and the other two plates 26 located a short distance inwardly of the opposing ends of the panel. Each plate 26 includes a pair of spaced apart inwardly directed flanges 28 having offset portions 30 spaced from the body of the plate to form elongated oppositely directed recesses 32 which serve to slidably receive the flat base plate 36 of a rigid anchor 38 (see FIGS. 8 and 9) thereby to securely hold the anchor 38 to the underside of the panel at approximately right angles thereto.

The anchor 38 includes, as noted above, a generally square base plate 36 to which is connected, at right angles to plate 36, an elongated anchor plate 40, the latter having a pointed V-shaped outer end to allow for easier insertion of same into the stack of bales, with a plurality of notches in the opposing edges of the plate 40 which serve to define teeth 42. Teeth 42 act to grip the sides of the bales and thus help to retain the anchor 38 in position. As seen in FIGS. 8A and 9, the relatively sharp tips of teeth 42 are skewed or bent away from the plane of the anchor plate (the tips preferably being about 2 inches from opposing sides of the plane of the plate) to increase their ability to grip the hay bales. The base plate 36 can easily be inserted into the recesses 32 of anchor guide and support plate 26 with the plane of anchor plate 40 aligned with the longitudinal axis of the panel 12. The anchors 38 can be slid to and fro parallel to the panel surface by a short distance in their respective guide and support plates 26 thereby to compensate for any misalignments between the stacked bales. This is of advantage since the bales at the top of the stack may be piled in such a way that it is desirable for some or all of the anchors 38 to be rearranged somewhat in order that they may fit properly between the bales.

As best seen in FIG. 4, the center anchor 38 is somewhat longer than the other two anchors 38 thereby to compensate for the higher elevation of the panel 12 at the ridge line 14 of same. Generally speaking, the anchors 38 should be sufficiently long as to project roughly 1½ feet downwardly between adjacent pairs of the stacked bales.

The anchors 38 are removed from the panels 12 prior to storage or transportation of the latter, thereby to allow the panels to be stacked neatly upon one another. The anchors may easily be installed on the panels just before the panels are positioned on the top of the stack of baled hay.

The hay bales are piled up on one another in conventional fashion, the width of the stack being selected in accordance with the length of the panels 12. When the stack has been completed, the panels 12 are placed in position, starting at one end of the stack with the anchors 38 of each panel being inserted as far as possible into the top of the stack between the bales to firmly anchor the panels in position. The panels are positioned in the side-by-side overlapping relationship depicted in FIGS. 2 and 6A so that rainwater does not run into the stack of bales.

The above described arrangement has been found to be effective in anchoring the panels in position even under the influence of very strong gale force winds. There is no need to provide anchor lines or ballast weights to hold the panels in position.

I claim:

1. A panel adapted to form a part of a protective cover for a stack of bales of hay or the like, said panel being elongated in form and adapted to be disposed on top of and to span the stack of bales, said panel defining an opposed pair of longitudinal marginal edges having means thereon for engaging additional ones of said panels which, in use, are disposed in side-by-side overlapping relationship with one another thereby to cover the entire top of the stack, the engaging means on said opposed longitudinal marginal edges comprising an upwardly turned lip extending along one of said edges and a downwardly turned lip extending along the other of said edges whereby, in use, adjacent oppositely directed lips of the overlapping panels can interengage one another in such away as to prevent water from leaking therebetween, and a plurality of anchoring means connected to the under surface of said panel and extending away from the panel surface, each anchoring means being elongated in form and adapted to project downwardly into the stack of bales with said anchoring means having means thereon for engaging the bales of hay thereby to permit the panel to be anchored to the stack said panel having a plurality of means attached to the undersurface thereof for releasably connecting said anchoring means thereto, said means for releasably connecting the anchoring means to the panel comprising spaced apart recess defining means constructed so as to permit the anchoring means to be slidably inserted thereinto and adjusted to and fro in a direction parallel to the panelundersurface.

2. A panel according to claim 1 wherein each anchoring means includes a base plate having an elongated anchor connected thereto and extending away from the base plate, the anchor having teeth defined thereon adapted to grip the bales of hay in the stack after the anchor has been inserted therein.

3. A panel according to claim 2 wherein the teeth are defined in opposing longitudinal edge portions of the anchor with the tips of the teeth being skewed away from one another such as to provide for a gripping action on the hay bales of the stack.

4. A panel according to claim 1 wherein the opposing ends of said panel are provided with outwardly and downwardly projecting eaves.

5. A protective cover comprising a plurality of panels each as defined in claim 1, said panels being in side-by-side overlapping relation and extending fully over the top of a stack of bales of hay or the like with said anchor means extending into the stack and engaging with the bales of said stack.

* * * * *